United States Patent [19]

Serizawa et al.

[11] Patent Number: 4,701,497
[45] Date of Patent: Oct. 20, 1987

[54] PROCESS FOR PRODUCING NOVEL PHOTOSENSITIVE RESINS

[75] Inventors: Hajime Serizawa, Koriyama; Keizo Ogihara, Sukagawa; Kiyoshi Shimizu, Koriyama; Susumu Harada, Tokyo, all of Japan

[73] Assignee: Nitto Boseki Co., Limited, Fukushima, Japan

[21] Appl. No.: 881,919

[22] Filed: Jul. 3, 1986

[30] Foreign Application Priority Data

Jul. 5, 1985 [JP] Japan .................................. 60-148036

[51] Int. Cl.$^4$ .......................................... C08F 271/00
[52] U.S. Cl. .................................... 525/292; 525/298; 525/301; 525/312; 522/149
[58] Field of Search ............... 525/292, 298, 301, 312, 525/328.2; 522/149

[56] References Cited

U.S. PATENT DOCUMENTS

| | | | |
|---|---|---|---|
| 2,566,302 | 9/1951 | Allen et al. | 525/292 |
| 2,610,120 | 9/1952 | Minsk et al. | 522/149 |
| 3,104,205 | 9/1963 | Hainer et al. | 525/328.2 |
| 3,556,792 | 1/1971 | Katz | 522/149 |
| 3,644,118 | 2/1972 | Agnihotri | 522/149 |
| 3,655,625 | 4/1972 | Thomas | 522/149 |
| 3,761,280 | 9/1973 | Wolff et al. | 522/149 |
| 3,817,757 | 6/1974 | Yabe et al. | 522/149 |
| 3,933,746 | 1/1976 | Steele | 522/149 |
| 3,933,885 | 1/1976 | Satomura | 522/149 |
| 4,087,725 | 4/1978 | Fukutani et al. | 522/149 |
| 4,559,391 | 12/1985 | Ueda | 525/328.2 |
| 4,604,451 | 8/1986 | Harada et al. | 525/382.2 |
| 4,626,577 | 12/1986 | Harada | 525/328.2 |

FOREIGN PATENT DOCUMENTS 0142962  5/1985  European Pat. Off. .

Primary Examiner—Joseph L. Schofer
Assistant Examiner—Bernard Lipman
Attorney, Agent, or Firm—Bert J. Lewen; Henry Sternberg

[57] ABSTRACT

A process for producing a novel photosensitive resin having cinnamic groups, comprising reacting a polyallylamine represented by the general formula (I)

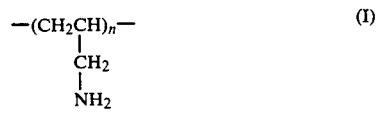

(wherein n is at least 10) or an inorganic acid salt thereof with a compound having a cinnamic group in the presence of a solvent. The process is free from drawbacks as experienced in the production of a conventional photosensitive resin (e.g. polyvinyl cinnamate), such as formation of by-products during the polymerization of a monomer (e.g. vinyl cinnamate).

4 Claims, 3 Drawing Figures

PROCESS FOR PRODUCING NOVEL PHOTOSENSITIVE RESINS

BACKGROUND OF THE INVENTION

1. Field of the Invention

The invention relates to a process for producing novel photosensitive resins. More particularly, the present invention relates to a process for producing photosensitive resins having cinnamic groups

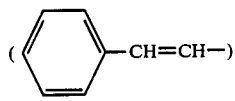

introduced into the side chains of a polyallylamine.

2. Description of the Prior Art

Many papers have hitherto been issued on the synthesis of photosensitive resins having cinnamic acid moieties at the side chains. The synthesis is largely divided into the following two processes.

One is a process wherein a vinyl compound having a cinnamic acid moiety is synthesized and the compound as a monomer is then polymerized to obtain a photosensitive resin. The other is a process wherein an appropriate resin selected as a support is reacted with a compound having a favorably modified cinnamic acid moiety to obtain a photosensitive resin.

As an example of the photosensitive resins produced according to the former process, there is widely known polyvinyl cinnamates obtained by polymerization of vinyl cinnamate, disclosed in U.S. Pat. No. 2,610,120 granted to Eastman Kodak Co. in 1952.

The former process, however, have drawbacks as follows. During the synthesis of the monomer, there occur side reactions such as partial polymerization of the monomer making the isolation and purification of the monomer more complex. Further, when the resin obtained is used in certain applications, the resin, having an unnecessarily large number of active sites, becomes hard and brittle after photocuring.

As an example of the photosensitive resins produced according to the latter process, there are photosensitive resins obtained by reacting a polyvinyl alcohol with a cinnamic acid chloride. These resins occupy the most part of the market of the latter photosensitive resins.

The above resins have problems with respect to, for example, the solvent used at the time of development thereof.

In photoresists of a polyvinyl cinnamate, for example, there is used a developping bath containing an organic solvent, but an aqueous developping bath is desired from the standpoint of the safety of working environment.

To improve the situation, attempts are under way to modify the resins so as to be soluble in aqueous alkali solutions, preferably in water. Examples of the modification include the introduction of carboxyl group into the resin [Kodak Co., U.S. Pat. No. 2,861,058 (1958)], the introduction of phenolic hydroxyl group into the resin [Fuji Yakuhin Kogyo K. K., Japanese Patent Publication No. 44601/1974] and the introduction of sulfonic acid group into the resin [UNITIKA, LTD., Japanese Patent Application Kokai (Laid-open) No. 55282/1973]. These modifications, however, require one additional production step making the process more complex and the product cost higher.

SUMMARY OF THE INVENTION

The object of the present invention is to provide a process for producing novel photosensitive resins wherein the above mentioned drawbacks of conventional photosensitive resins have been solved.

The present inventors made an extensive research in order to achieve the object. As a result, it was found that novel photosensitive resins having cinnamic groups which are free from the drawbacks of conventional photosensitive resins can be obtained by reacting a polyallylamine represented by the following general formula (I)

(wherein n is at least 10) or its inorganic acid salt (the first economical synthesis of which was attained by Harada, one of the present inventors) with a compound having a cinnamic group in the presence of a solvent. This finding has led to the completion of the present invention.

Accordingly, the gist of the present invention resides in a process for producing a photosensitive resin having cinnamic groups, comprising reacting a polyallylamine represented by the general formula (I)

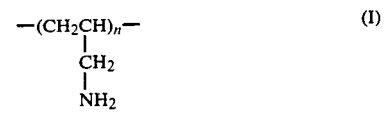

(wherein n is at least 10) or its inorganic acid salt with a compound having a cinnamic group in the presence of a solvent.

DESCRIPTION OF PREFERRED EMBODIMENTS

Figure 1:
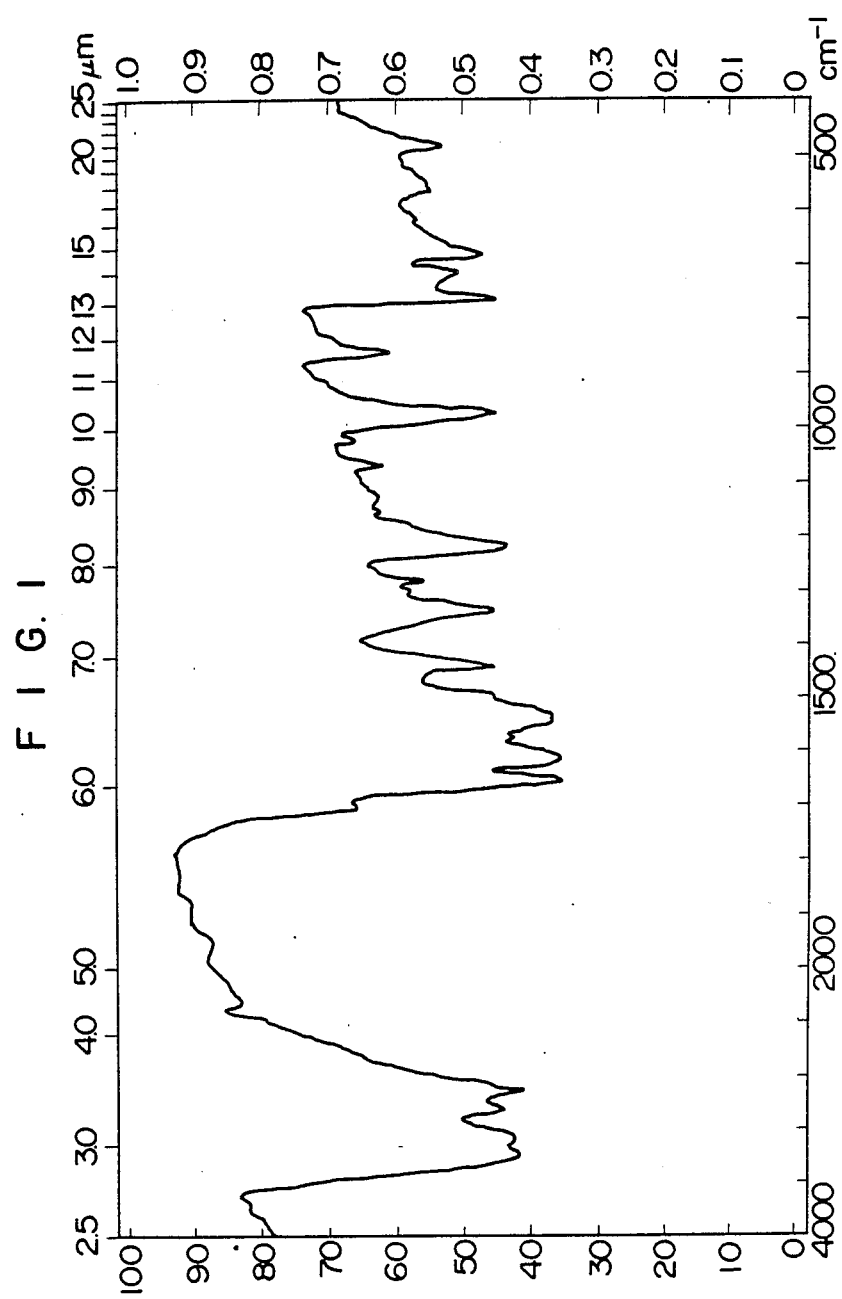
FIGS. 1, 2 and 3 are the infrared absorption spectra of the photosensitive resins obtained according to the process of the present invention.

As the polyallylamine represented by the general formula (I) or its inorganic acid salt, both used as one starting material in the present invention, there are preferably used polymers obtained by the processes as disclosed in, for example, Japanese Patent Application Kokai (Laid-open) No. 201811/1983 and U.S. Pat. No. 4,504,640 which comprises radical-polymerizing an inorganic acid salt of mono allylamine in the presence of a radical polymerization initiator having an azo group in the molecule. There can also be used polymers obtained by other radical polymerization processes using other radical polymerization initiators or by other polymerization processes (e.g. radiation polymerization process). As the inorganic acid salt of a polyalyllamine, there can be mentioned a hydrochloride, a sulfate, a phosphate, a nitrate, etc.

In the general formula (I), n is specified to be at least 10. The reason is that when n is less than 10, the photosensitive resin obtained does not exhibit characteristics as a high polymer and has no film formability. In order for the photosensitive resin obtained to possess an appropriate resolution, n is preferably 300 or less. In view of both of the film formability and the resolution, it is particularly preferable that n be in the range of 20 to 100.

In the present invention, the polyallylamine represented by the general formula (I) or an inorganic acid salt thereof is reacted with a compound having a cinnamic group in the presence of a solvent.

Typical examples of the compound having a cinnamic group include cinnamic acid, cinnamaldehyde, cinnamic acid halide, glycidyl cinnamate, etc.

Typical examples of the solvent include methanol, ethanol, propanol, butanol, DMF, DMSO, N-methylpyrrolidone, etc.

The photosensitive resin obtained is largely divided into the following three types depending upon the reaction conditions employed (e.g. the type of the compound having a cinnamic group, the mole ratio of raw materials, the presence or absence of a strongly basic substance).

(1) Photosensitive resin represented by the general formula (II)

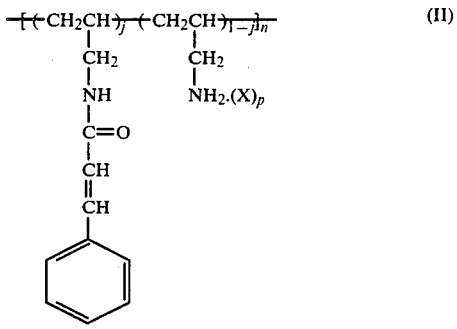

(wherein n is at least 10; j is a number satisfying $0 < j \leq 1$; X is a salt of an inorganic acid such as HCl, HBr or the like; and p is 0 or 1).

This photosensitive resin (II) can be obtained by reacting a polyallylamine of the general formula (I) or its inorganic acid salt with a cinnamic acid halide in the presence of an alcoholic solution of a strongly basic substance.

(2) Photosensitive resin represented by the general formula (III)

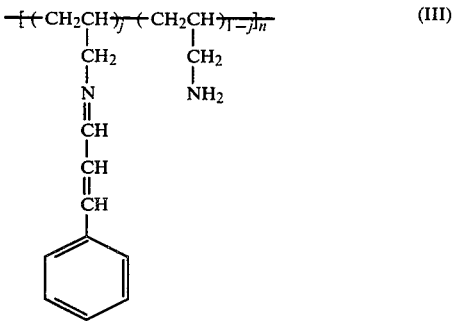

[wherein n and j each have the same definitions as in the general formula (II)].

This photosensitive resin can be obtained by reacting a polyallylamine of the general formula (I) or its inorganic acid salt with cinnamaldehyde in the presence of an alcohol.

(3) Photosensitive resin represented by the general formula (IV)

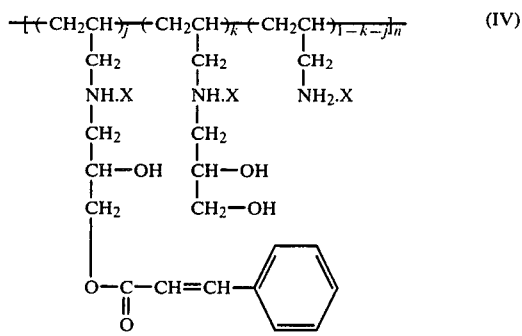

[wherein n, j and X each have the same definition as in the general formula (II); k is a number satisfying $0 \leq k < 1$ and k and j satisfy the relation of $k + j \leq 1$].

This photosensitive resin can be obtained by reacting a polyallylamine of the general formula (I) or its inorganic acid salt with glycidyl cinnamate in an alcohol solution.

As already described with respect to the general formula (I), n of the general formulas (II), (III) and (IV) is specified to be at least 10 from the required film formability and further is preferred to be 300 or less from the required resolution. In view of both of the film formability and the resolution, the preferable range of n is 20 to 100.

A DMF solution of the photosensitive resin (II), (III) or (IV) obtained according to the process of the present invention has an absorption based on the $\pi \rightarrow \pi^*$ transition rate of cinnamic acid, at 272, 273 or 282 nm, respectively. Therefore, the resin can be crosslinked and insolubilized by exposing to ultraviolet rays of said wavelength range and accordingly has many applications as a photosensitive resin.

Of the photosensitive resins (II), (III) and (IV), the resin (IV), in particular, is easily soluble in water as it is, as seen in Example 4, without being given any modification as mentioned previously. Therefore, the resin (IV) is advantageous with respect to working environment and economy.

Further, the photosensitive resin (IV), having many hydroxyl groups at the side chains, is excellent in adhesivity, etc.

The photosensitive resins (II) and (III) as well can be made water-soluble, by rendering the j values small without deteriorating their photosensitivities.

The present invention will specifically be explained below by way of Examples. However, the present invention is in no way restricted to these Examples. Incidentally, the synthesis of Examples 1 to 5 was conducted in ultraviolet-shielded environments.

EXAMPLE 1

To a solution of 5.71 g of a polyallylamine (molecular weight: 10,000) dissolved in 24 ml of methanol was added a solution of 5.61 g of potassium hydroxide dissolved in 50 ml of methanol.

To the resulting solution being stirred at room temperature was dropwise added a solution of 16.66 g of cinnamic acid chloride dissolved in 50 ml of ether. After the completion of the dropping, stirring was continued for further 1 hour. The precipitate formed was collected by filtration, washed with ether, methanol, 1N HCl and methanol in this order, and then dried under reduced pressure to obtain 16.37 g of a white powder.

The infrared absorption spectrum of the substance is shown in FIG. 1. The Figure shows that differently from the infrared absorption spectrum of a polyallylamine hydrochloride, there is observed an absorption based on

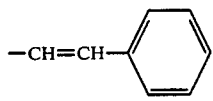

group at 1655 cm$^{-1}$.

In the $^1$H-NMR absorption spectrum of the substance, there was observed a spectrum which was a combination of the spectrum of a polyallylamine hydrochloride and the absorption of

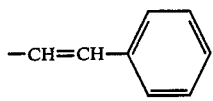

group.

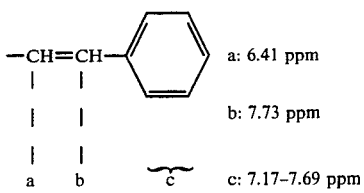

a: 6.41 ppm
b: 7.73 ppm
c: 7.17–7.69 ppm

In the UV absorption spectrum of a DMF solution of the substance, there was detected an absorption based on the $\pi \rightarrow \pi^*$ transition state of cinnamic acid at 272 nm.

The solubilities of the substance when 50 mg of thereof was added to 5 ml of a solvent at room temperature are shown in Table 1.

TABLE 1

| Solvent | Solubility |
|---|---|
| Water | Insoluble |
| Methanol | Insoluble |
| Acetone | Insoluble |
| DMF | Easily soluble |
| DMSO | Insoluble |
| Xylene | Insoluble |
| CCl$_4$ | Insoluble |
| CHCl$_3$ | Insoluble |
| Ether | Insoluble |

Polyallylamines are soluble only in water and methanol and polyallylamine hydrochlorides are soluble only in water, while the substance is soluble only in DMF.

Based on the above results, the substance obtained is concluded to have the following chemical structure.

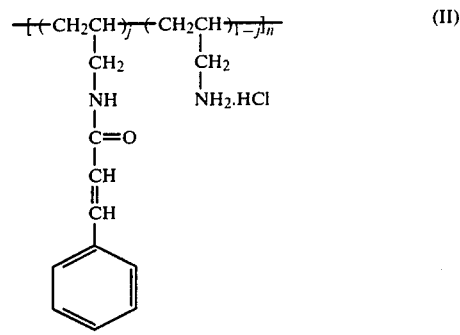

From the absorption intensity based on cinnamoyl group in the measurement of the UV absorption spectrum of the substance, j was determined to be 0.84.

From the molecular weight of the polyallylamine hydrochloride used as a starting material, n is about 90 to 118.

EXAMPLE 2

Synthesis was conducted in the same manner as in Example 1 except that 5.61 g of potassium hydroxide used in Example 1 was changed to 4.00 g of sodium hydroxide, whereby 15.40 g of a white powder was obtained.

The infrared absorption spectrum, $^1$H-NMR absorption spectrum, UV absorption spectrum and solubilities of the substance obtained were identical to those of Example 1. Accordingly, the white powder is concluded to have a chemical structure represented by the general formula (II) (j=0.78, n=about 100).

EXAMPLE 3

To a solution of 5.71 g of a polyallylamine dissolved in 74 ml of methanol was being stirred at room temperature, there was dropwise added a solution of 14.54 g of cinnamaldehyde dissolved in 50 ml of methanol. After the completion of the dropping, stirring was continued for further 1 hour. The precipitate formed was collected by filtration and washed with methanol. This precipitate was dissolved in a small amount of DMF and then reprecipitated from methanol. The precipitate formed was thoroughly washed with methanol and dried under reduced pressure to obtain 10.3 g of a pale yellow powder.

Figure 2:
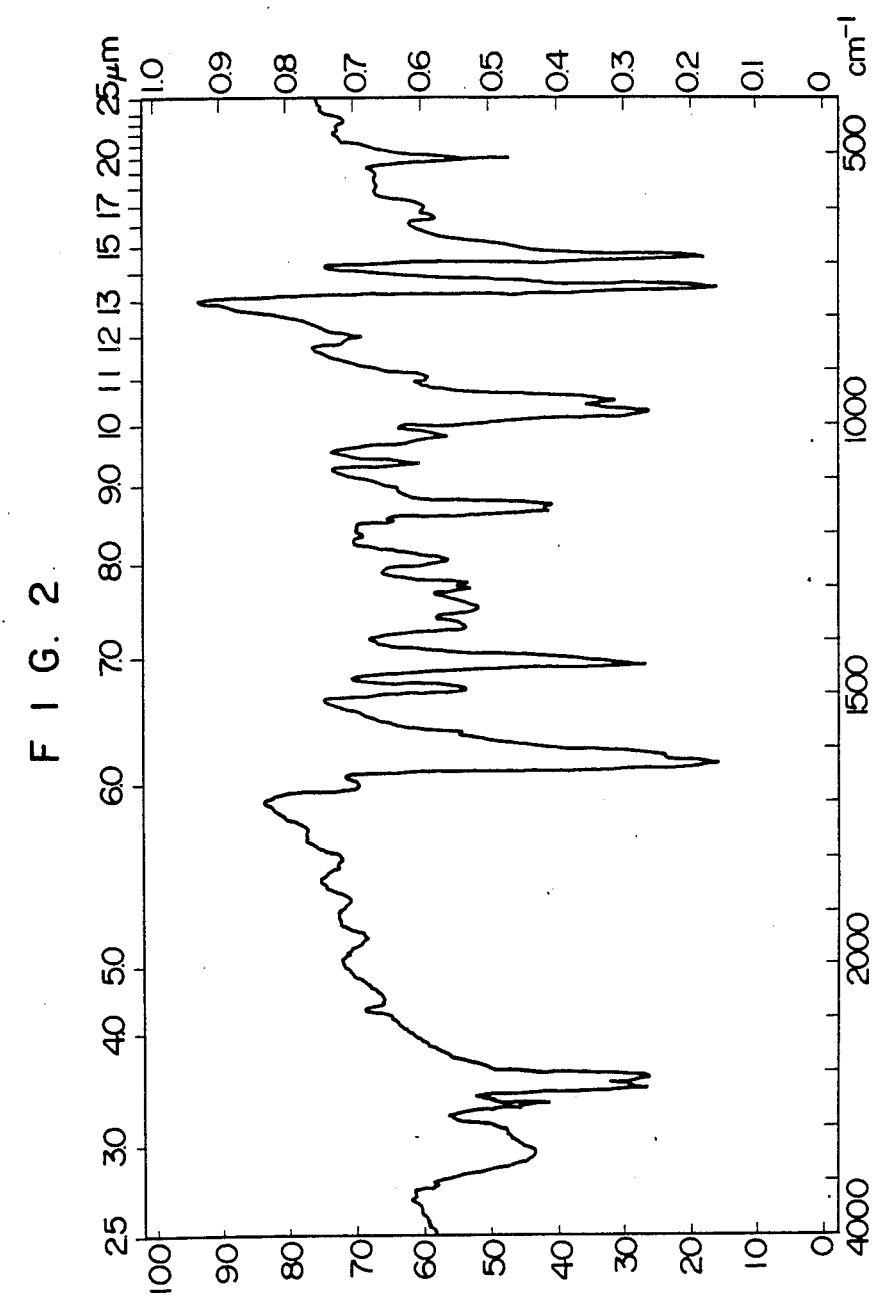

The infrared absorption spectrum of the substance is shown in FIG. 2. According to the Figure there is observed an absorption based on

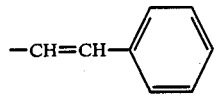

group at 1630 cm$^{-1}$.

The $^1$H-NMR absorption spectrum and UV absorption spectrum of the substance were identical to those of Example 1.

The solubilities of the substance are shown in Table 2.

TABLE 2

| Solvent | Solubility |
|---|---|
| Water | Insoluble |
| Methanol | Swelling |
| Acetone | Swelling |
| DMF | Easily soluble |

TABLE 2-continued

| Solvent | Solubility |
|---|---|
| DMSO | Swelling |
| Xylene | Soluble |
| CCl₄ | Soluble |
| CHCl₃ | Easily soluble |
| Ether | Insoluble |

Polyallylamines are soluble only in water and methanol and polyallylamine hydrochlorides are soluble only in water. As seen in Table 2, the substance is soluble in organic solvents and shows a solubility characteristics very differently from polyallylamines and their salts.

Based on the above, the substance obtained is concluded to have the following chemical structure.

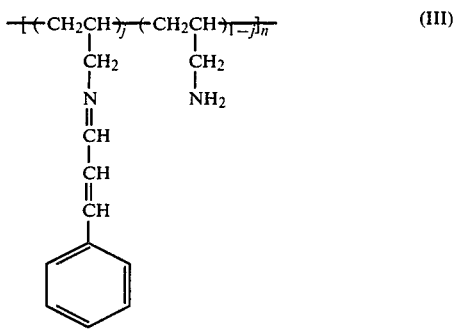

(III)

From the measurement of the UV absorption spectrum of the substance, j was determined to be 0.98. n is about 90 to 118.

EXAMPLE 4

Glycidyl cinnamate was synthesized according to a process by Nishikubo et al (Journal of the Chemical Society of Japan, Chemistry and Industrial Chemistry, 1973, No. 10, 1851).

30 g of this glycidyl cinnamate was dropwise added to a solution of 5.71 g of a polyallylamine dissolved in 174 ml of methanol. After the dropping, stirring was continued for 13 hours at 40° C. Methanol saturated with hydrochloric acid gas was added thereto with cooling to adjust to pH 3 to 4. Then, the reaction system was poured into ether.

The precipitate formed was washed with ether and acetone in this order and dried under reduced pressure to obtain 21.0 g of a white powder.

Figure 3:
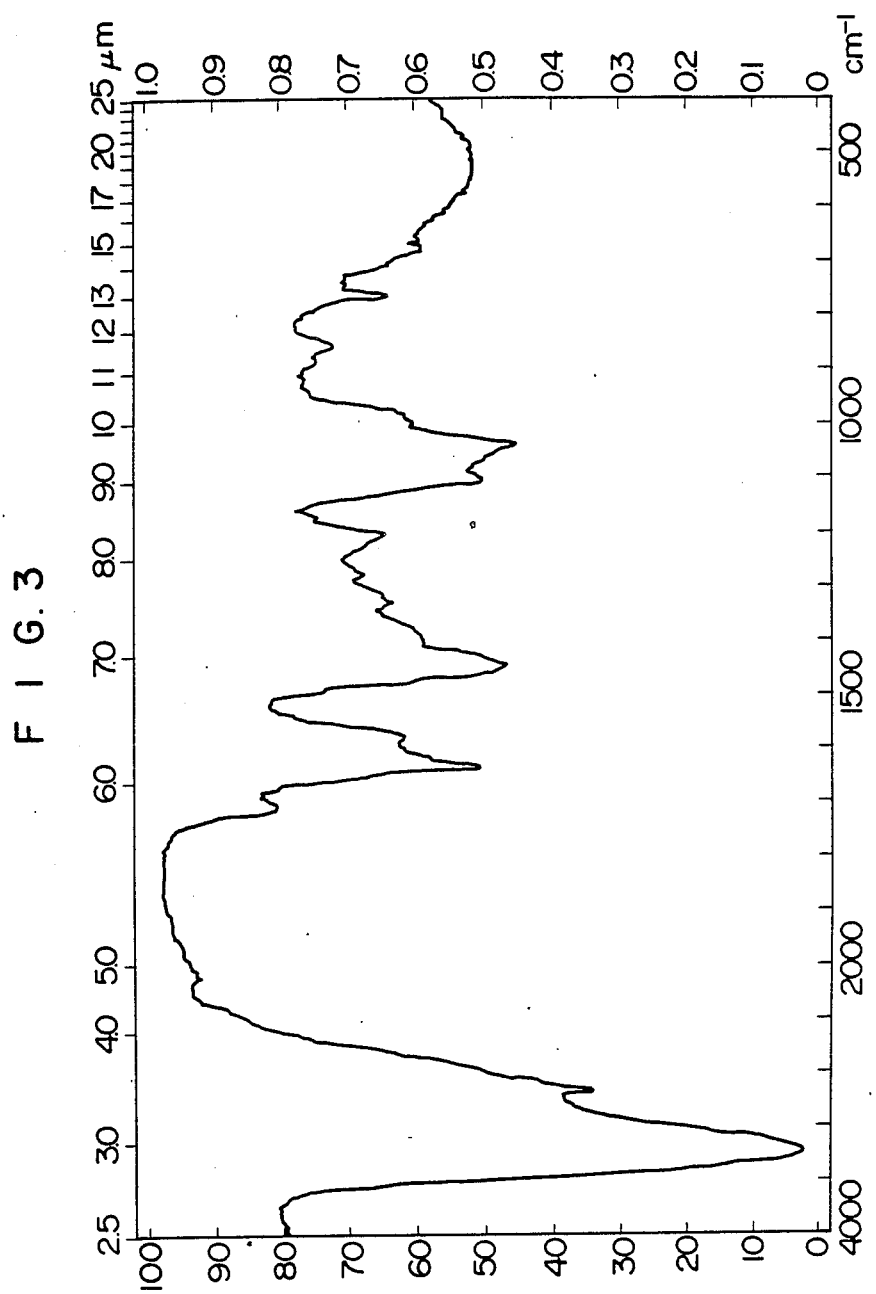

The infrared adsorption spectrum of the substance obtained is shown in FIG. 3. Differently from polyallylamine hydrochlorides, the substance has an absorption based on

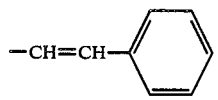

group at 1640 cm⁻¹.

The ¹H-NMR absorption spectrum and UV absorption spectrum of the substance, similarly to those of Example 1, showed the presence of

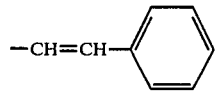

The solubilities of the substance are shown in Table 3.

TABLE 3

| Solvent | Solubility |
|---|---|
| Water | Easily soluble |
| Methanol | Soluble |
| Acetone | Insoluble |
| DMF | Easily soluble |
| DMSO | Soluble |
| Xylene | Insoluble |
| CCl₄ | Insoluble |
| CHCl₃ | Insoluble |
| Ether | Insoluble |

Based on the above, the substance is concluded to have the following chemical structure (n=90 to 118).

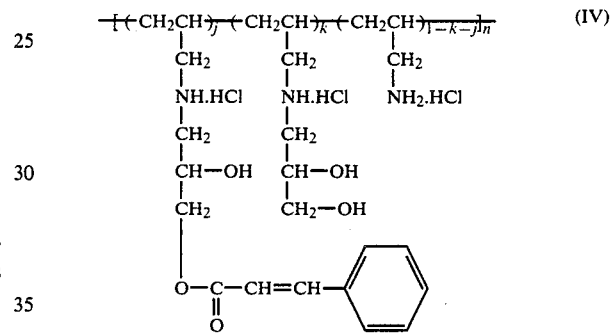

(IV)

The number of all amine groups was determined from a conductometric titration. The number of all cinnamoyl groups was determined from an UV measurement.

As a result, j was found to be 0.19. Further, from the absorption intensity of the protons of —OH groups in the ¹H-NMR absorption spectrum, k was found to be 0.1.

EXAMPLE 5

Synthesis was conducted in the same manner as in Example 4 except that 5.71 g of a polyallylamine obtained by freeze-drying was dissolved in 150 g of methanol, whereby 21.5 g of a resin was obtained.

The infrared absorption spectrum, UV absorption spectrum and ¹H-NMR absorption spectrum were identical to those of the resin obtained in Example 4. This resin is soluble in water, methanol, DMF and DMSO.

Based on the above, this substance was confirmed to have a chemical structure represented by the general formula (IV).

EXAMPLE 6

The photosensitive resin (II) synthesized in Example 1, the photosensitive resin (III) synthesized in Example 3 and the photosensitive resin (IV) synthesized in Example 4 were dissolved in DMF, chloroform and methanol, respectively, in an ultraviolet-shielded environment, whereby three solutions each of about 5% resin concentration were prepared.

Each solution was coated on a slide glass and they were dried in a hot air current to obtain films.

Using a high pressure mercury lamp, each film was exposed to ultraviolet rays through a mask film for 2 minutes, with the film-lamp distance kept at 5 cm. Subsequently, the films of the photosensitive resins (II), (III) and (IV) were immersed in DMF, chloroform and water, respectively, for development. In each film, the nonexposed portions were dissolved and removed and the exposed portions remained as a film.

Further, in each film, the exposed portions showed no swelling during development and the remained film showed good resolution.

The technical advantages obtained by the present invention are as follows.

1. A photosensitive resin can easily be obtained in one step by reacting a polyallylamine or its inorganic acid salt with a compound having a cinnamic group. The process of the present invention is free from drawbacks as experienced in the production of a conventional photosensitive resin (e.g. polyvinyl cinnamate), such as reduction of monomer (e.g. vinyl cinnamate) yield due to the undesirable partial polymerization thereof during the monomer synthesis as well as formation of by-products during vinyl cinnamate polymerization.

2. The photosensitive resins obtained according to the present invention, being able to give a sharp image after ultraviolet exposure and development, have wide applications as an image-forming material, such as a substrate for printed circuit board, a printing plate and the like.

The photosensitive resins represented by the general formula (IV), in particular, are water-soluble and advantageous in workability and economy. Moreover, these resins are excellent in adhesivity toward substrate.

What is claimed is:

1. A process for producing a photosensitive resin having cinnamic groups, comprising reacting a polyallylamine represented by the general formula (I)

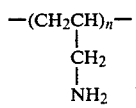

wherein n is at least 10 or an inorganic acid salt thereof with a compound selected from the group consisting of cinnamic acid, cinnamaldehyde, cinnamic acid halide and glycidyl cinnamate in the presence of a solvent.

2. A process according to claim 1, wherein the polyallylamine of the general formula (I) or its inorganic acid salt is reacted with a cinnamic acid halide as the compound having a cinnamic group to prepare a photosensitive resin represented by the general formula (II)

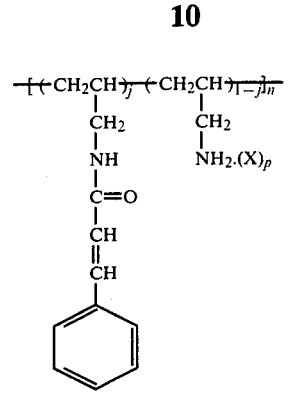

wherein n is at least 10; j is a number satisfying $0 < j \leq 1$; X is a salt of an inorganic acid; and p is 0 or 1.

3. A process according to claim 1, wherein the polyallylamine of the general formula (I) or its inorganic acid salt is reacted with cinnamaldehyde as the compound having a cinnamic group to prepare a photosensitive resin represented by the general formula (III)

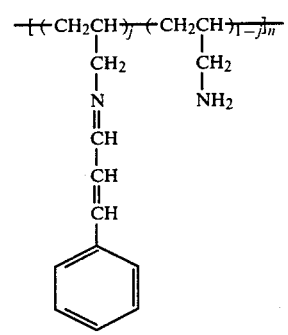

(wherein n is at least 10; and j is a number satisfying $0 < j \leq 1$).

4. A process according to claim 1, wherein the polyallylamine of the general formula (I) or its inorganic acid salt is reacted with glycidyl cinnamate as the compound having a cinnamic group to prepare a photosensitive resin represented by the general formula (IV)

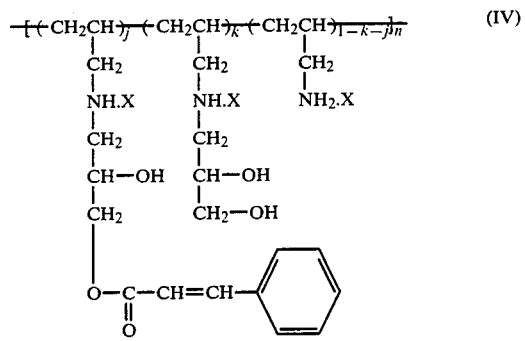

wherein n is at least 10; j is a number satisfying $0 < j \leq 1$; k is a number satisfying $0 \leq k < 1$; k and j satisfy the relation of $k + j \leq 1$; and X is a salt of an inorganic acid.

* * * * *

UNITED STATES PATENT AND TRADEMARK OFFICE
CERTIFICATE OF CORRECTION

PATENT NO. : 4,701,497

DATED : October 20, 1987

INVENTOR(S) : Hajime Serizawa et al.

It is certified that error appears in the above-identified patent and that said Letters Patent is hereby corrected as shown below:

Column 10, claim 3, line 37, before "wherein" delete "("; line 38, after "1" delete ")".

Signed and Sealed this

Twenty-second Day of March, 1988

Attest:

DONALD J. QUIGG

Attesting Officer

Commissioner of Patents and Trademarks